INVENTORS.
ROBERT COHEN
JOHN F. COULEUR
WILLIAM A. SHELLY
BY
ATTORNEYS

United States Patent Office 3,482,264
Patented Dec. 2, 1969

3,482,264

DATA PROCESSING SYSTEM INCLUDING COMMUNICATION PRIORITY AND PRIORITY SHARING AMONG SUBSYSTEMS

Robert Cohen, John F. Couleur, and William A. Shelly, Phoenix, Ariz., assignors to General Electric Company, a corporation of New York Filed July 7, 1966, Ser. No. 563,522
Int. Cl. G06f *1/02;* H04q *3/64*
U.S. Cl. 340—172.5 19 Claims

ABSTRACT OF THE DISCLOSURE

A data processing system including a processor, a memory, an input/output controller and input/output device, each requiring communication with the others and each communication having a predetermined priority. A memory controller acts as the communications center among the subsystems and provides a communication receiving arrangement for storing requests for communication and for assigning a predetermined priority to each request. The priority system prevents monopolization of the communication channels by including a plurality of presettable priority sharing devices, each corresponding to a different one of the subsystems of the system. The presetting of the priority sharing devices may be programmed and each, when set, will inhibit the priority domination of its associated subsystem for a predetermined time.

INTRODUCTION

The present invention pertains to data processing systems, and more specifically, to those systems utilizing control means for controlling communication among the subsystems of the data processing system.

A data processing system includes a data processor for manipulating data in accordance with the instructions of a program. The processor will receive an instruction, decode the instruction, and perform the operation indicated thereby. The operation is performed upon data received by the processor and temporarily stored thereby during the operation. The series of instructions are called a program and include decodable operations to be performed by the processor. The instructions of the program are obtained sequentially by the processor and, together with the data to be operated upon, are stored in memory devices.

The memory device may form any of several well-known types; however, most commonly, the main memory is a random access coincident current type having discrete addressable locations each of which provides storage for a word. The word may form data or instructions and may contain specific fields useful in a variety of operations. Normally, when the processor is in need of data or instructions it will generate a memory cycle and provide an address to the memory. The data or word stored at the addressed location will subsequently be retrieved and provided to the data processor.

A series of instructions comprising a program are usually "loaded" into the memory at the beginning of operation and thus occupies a "block" of memory which normally must not be disturbed until the program has been completed. Data to be operated upon by the processor in accordance with the instructions of the stored program is stored in other areas of memory and is retrieved and replaced in accordance with the decoded instructions.

Communication with the data processing system usually takes place through the media of input/output devices including such apparatus as magnetic tape handlers, paper tape readers, punch card readers, remote terminal devices (for time sharing and real time applications specific terminal devices may be designed to gain access to the data processing system). To control the receipt of information from input/output devices and to coordinate the transfer of information to and from such devices, an input/output control means is required. Thus, an input/output controller is provided and connects the data processing system to the variety of input/output devices. The input/output controller coordinates the information flow to and from the various input/output devices and also awards priority when more than one input/output device is attempting to communicate with the data processing system. Since input/output devices are usually electromechanical in nature and necessarily have much lower operating speed than the remainder of the data processing system, the input/output controlling provides buffering to enable the processing system to proceed at its normal rate without waiting for the time consuming communication with the input/output device.

The data processing system thus described includes a processor, a memory, an input/output controller, and input/output devices. In many applications it may be found to be advantageous to utilize more than one processor and under most circumstances more than one block of memory may be used. Further, in those system configurations requiring a large number of input/output devices, a number of input/output controllers may be used each controlling a plurality of input/output devices.

To provide flexibility and also to coordinate the communication among the processor, memory device, and input/output controller, a memory controller may be utilized. A memory controller is the sole means of communication among the subsystems of the data processing system and receives requests for access to memory as well as specific requests for communication to other subsystems. The memory controller provides a means for coordinating the execution of operations and transfers of information among the subsystems and is also the means for awarding priority when accesses to memory are requested by more than one subsystem, or when more than one subsystem requests communication with another subsystem.

When requests for access to memory or requests for communication (these requests may be referred to as memory access request signals or channel interrupt signals) with other subsystems are received by the memory controller, a priority arrangement is provided; however, the present invention utilizes a unique signal-receiving scheme wherein requests for communication are stored pending the granting of priority. To provide maximum efficiency for information flow throughout the system, all requests for communication from a subsystem are received by the memory controller and result in the setting of a flip-flop. When the memory controller assumes "not busy" condition, indications of requests for communication from subsystems stored in the flip-flops are transferred to a second arrangement of flip-flops the outputs of which are connected in a predetermined priority order. The flip-flops to first receive communication requests are then reset and are available to receive additional requests from the same communicating devices or subsystems. The transfer of information requests from one series of flip-flops to a second enables an orderly priority arrangement to be implemented while nevertheless always permitting the receipt of communication request signals and storage of their receipt.

In many instances a high priority subsystem may tend to monopolize the memory controller thereby inhibiting the orderly progress of communication within the system. While under most circumstances, a high priority subsystem by definition requires the most urgent attention, program flexibility dictates the need for occasionally altering this priority. The system of the present invention provides a means for forcing higher priority subsystems to share communication priority with lower priority subsystems under certain predetermined conditions. In the embodiment chosen for illustration the priority sharing is implemented through the utilization by priority sharing switches, however, it will be obvious to those skilled in the art that programmable devices such as flip-flops may readily be substituted for the switches to facilitate an even greater system flexibility.

It is therefore an object of the present invention to provide a data processing system having a predetermined subsystem communication priority wherein the priority may readily be changed.

It is another object of the present invention to provide a data processing subsystem communication priority scheme wherein high priority subsystems may be forced to share priority with other subsystems.

It is still another object of the present invention to provide a data processing system wherein the subsystems thereof are each awarded a predetermined wired priority and wherein the higher priority subsystems may be forced to share priority with normally lower priority subsystems.

It is a further object of the present invention to provide a data processing system wherein the subsystems thereof, while having a predetermined priority of communication, may be grouped into priority groups within which a predetermined priority exists while priority sharing is forced upon the respective group.

These and other objects and advantages of the present invention will become apparent to those skilled in the art as the description of the invention proceeds.

Certain portions of the apparatus herein disclosed are not of our invention, but are the invention of:

Robert Cohen, William A. Shelly, and Samuel M. Vidulich, as defined by the claims of their application, Ser. No. 567,221, filed July 22, 1966;

David L. Bahrs and John F. Couleur, as defined by the claims of their application, Ser. No. 567,222, filed July 22, 1966;

John F. Couleur and Richard L. Ruth, as defined by the claims of their application, Ser. No. 569,750, filed Aug. 2, 1966;

John F. Couleur, Philip F. Gudenschwager, Richard L. Ruth, William A. Shelly, and Leonard G. Trubisky, as defined by the claims of their application, Ser. No. 577,376, filed Sept. 6, 1966;

John F. Couleur, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being assigned to the assignee of the present application.

DESCRIPTION OF FIGURES

The present invention may more readily be described by reference to the accompanying drawings in which.

Figure 1:
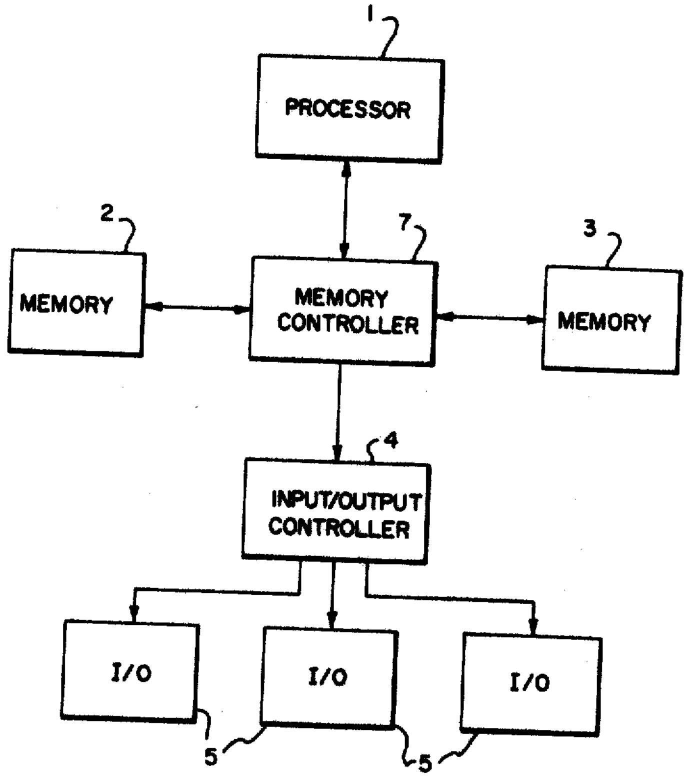
FIGURE 1 is a block diagram of a data processing system in a single memory controller configuration.

For a complete description of the system of FIGURE 1 and of our invention, reference is made to United States Patent No. 3,413,613 issued to David L. Bahrs, John F. Couleur, Richard L. Ruth, and William A. Shelly, on Nov. 26, 1968, and assigned to the assignee of the present invention. More particularly, attention is directed to FIGURES 2–120 and to the specification beginning at column 4, line 32 and ending at column 121, line 42 inclusive of United States Patent No. 3,413,613 which are incorporated herein by reference and made a part hereof.

What is claimed is:

1. In a data processing system the improvement comprising: a plurality of subsystems each requiring communication with other subsystems and each including means for generating communication request signals, said subsystems having a predetermined priority of communication; a communication control device connected to said subsystem responsive to said communication request signals for awarding priority of communication among said subsystems; said communication control device including a plurality of presettable priority sharing devices each corresponding to a different one of said plurality of subsystems; each priority sharing device inhibiting, for a predetermined time when preset, the awarding of priority to its particular corresponding subsystem when said subsystem requests communication.

2. In a data processing system the improvement comprising: a plurality of subsystems each requiring communication with other subsystems and each including means for generating communication request signals, said subsystems having a predetermined priority of communication; a communication control device connected to said subsystems responsive to said communication request signals for awarding priority of communication among said subsystems; said communication control device including a plurality of presettable priority setting devices each corresponding to a different one of said plurality of subsystems; each presettable priority setting device inhibiting, for a predetermined time when preset, the awarding of priority to its particular corresponding subsystem when said subsystem requests communication, and any other subsystem requesting communication and having a predetermined priority higher than said particular subsystem.

3. In a data processing system the improvement comprising: a plurality of subsystems each requiring communication with other subsystems and each including means for generating communication request signals, said subsystems having a predetermined priority of communication; a communication control device connected to said subsystems responsive to said communication request signals for awarding priority of communication among said subsystems; said communication control device including a plurality of presettable programmable bistable devices each corresponding to a different one of said plurality of subsystems; each presettable programmable bistable device inhibiting, for a predetermined time when preset, the awarding of priority to its particular corresponding subsystem when said subsystem requests communication.

4. In a data processing system the improvement comprising: a plurality of subsystems each requiring communication with other subsystems and each including means for generating communication request signals, said subsystems having a predetermined priority of communication; a communication control device connected to said subsystems responsive to said communication request signals for awarding priority of communication among said subsystems; said communication control device including a plurality of presettable programmable bistable devices each corresponding to a different one of said plurality of subsystems; each presettable programmable bistable device inhibiting, for a predetermined time when preset, the awarding of priority to its particular corresponding subsystem when said subsystem requests communication, and any other subsystem requesting communication and having a predetermined priority higher than particular subsystem.

5. In a data processing system the improvement comprising: a plurality of subsystems each requiring communication with other subsystems and each including means for generating communication request signals, said subsystems having a predetermined priority of communication; a communication control device connected to said subsystems responsive to said communication request signals for awarding priority of communication among said subsystems; said communication control device including a plurality of presettable switches each corresponding to a different one of said plurality of subsystems; and presettable switch inhibiting, for a predetermined time when preset, the awarding of priority to its particular corresponding subsystem when said subsystem requests communication.

6. In a data processing system the improvement comprising: a plurality of subsystems each requiring communication with other subsystems and each including means for generating communication request signals, said subsystems having a predetermined priority of communication; a communication control device connected to said subsystems responsive to said communication request signals for awarding priority of communication among said subsystems; said communication control device including a plurality of presettable switches each corresponding to a different one of said plurality of subsystems; each presettable switch inhibiting, for a predetermined time when preset, the awarding of priority to its particular corresponding subsystem when said subsystem requests communication, and any other subsystem requesting communication and having a predetermined priority higher than said particular subsystem.

7. In a data processing system the improvement comprising: a plurality of subsystems each requiring communication with other subsystems and each including means for generating communication requests signals; a memory controller connected to said subsystems responsive to said communication request signals for awarding priority of communication among said subsystems, said memory controller including: a plurality of storage devices each connected to receive communication request signals from a different one of said subsystems and responsive to the receipt of a communication request signal for assuming a given stable state; priority means connected to said storage devices responsive to a given stable state of more than one of said plurality of storage devices for awarding priority of communication to a subsystem in accordance with a predetermined priority; said priority means including a plurality of presettable priority sharing devices each corresponding to a different one of said storage devices; each presettable priority sharing device inhibiting, for a predetermined time when preset, the awarding of priority to its particular corresponding subsystem when said subsystem requests communication.

8. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a plurality of storage devices each connected to receive communication request signals from a different one of said subsystems and responsive to the receipt of a communication request signal for assuming a given stable state; priority means connected to said storage devices responsive to a given stable state of more than one of said plurality of storage devices for awarding priority of communication to a subsystem in accordance with a predetermined priority; said priority means including a plurality of presettable priority sharing devices each corresponding to a different one of said storage devices; each presettable priority sharing device inhibiting, for a predetermined time when preset, the awarding of priority to its particular corresponding subsystem when said subsystem requests communication, and any other subsystem requesting communication having a priority higher than said particular subsystem.

9. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a plurality of storage devices each connected to receive communication request signals from a different one of said subsystems and responsive to the receipt of a communication request signal for assuming a given stable state; priority means connected to said storage devices responsive to a given stable state of more than one of said plurality of storage devices for awarding priority of communication to a subsystem in accordance with a predetermined priority; said priority means including a plurality of presettable programmable bistable devices each corresponding to a different one of said storage devices; each presettable programmable bistable device inhibiting, for a predetermined time when preset, the awarding of priority to its particular corresponding subsystem when said subsystem requests communication.

10. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a plurality of storage devices each connected to receive communication request signals from a different one of said subsystems and responsive to the receipt of a communication request signal for assuming a given stable state; priority means connected to said storage devices responsive to a given stable state of more than one of said plurality of storage devices for awarding priority of communication to a subsystem in accordance with a predetermined priority; said priority means including a plurality of presettable programmable bistable devices each corresponding to a different one of said storage devices; each presettable programmable bistable device inhibiting, for a predetermined time when preset, the awarding of priority to its particular corresponding subsystem when said subsystem requests communication, and any other subsystem requesting communication having a priority higher than said particular subsystem.

11. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a plurality of storage devices each connected to receive communication request signals from a different one of said subsystems and responsive to the receipt of a communication request signal for assuming a given stable state; priority menas connected to said storage devices responsive to a given stable state of more than one of said plurality of storage devices for awarding priority of communication to a subsystem in accordance with a predetermined priority; said priority means including a plurality of presettable switches each corresponding to a different one of said storage devices; each presettable switch inhibiting, for a predetermined time when preset, the awarding of priority to its particular corresponding subsystem when said subsystem reques's communication.

12. In a data processing system the improvement comprising: a plurality of subsystems each requiring communication with other subsystems each including means for generating communication request signals; a memory controller connected to said subsystems responsive to said communication request signals for awarding priority of communication among said subsystems, said memory controller including: a plurality of storage devices each connected to receive communication request signals from a different one of said subsystems and responsive to the receipt of a communication request signal for assuming a given stable state; priority means connected to said storage devices responsive to a given stable state of more than one of said plurality of storage devices for awarding priority of communication to a subsystem in accordance with a predetermined priority; said priority means including a plurality of presettable switches each corresponding to a different one of said storage devices; each presettable switch inhibiting, for a predetermined time when preset, the awarding of priority to its particular corresponding subsystem when said subsystem requests communication, and any other subsystem requesting communication having a priority higher than said particular subsystem.

13. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a first plurality of storage devices each connected to receive communication request signals from a different one of said subsystems and each responsive to the receipt of a communication request signal for assuming a given stable state; a status signal generating means responsive to the status of said memory controller for generating a not busy signal; a second plurality of storage devices each connected to a different one of said first storage devices and each responsive to the simultaneous occurrence of said not busy signal and the given stable state of a connected one of said first plurality of storage devices for assuming a given stable state; priority means connected to said second plurality of storage devices responsive to a given stable state of more than one of said second plurality of storage devices for awarding priority of communication to a subsystem in accordance with a predetermined priority; said priority means including a plurality of presettable priority sharing devices each corresponding to a different one of said second plurality of storage devices and to a different one of said subsystems; each presettable priority sharing device inhibiting, for a predetermined time when preset, the awarding of priority to its particular corresponding subsystem when said subsystem requests communication.

14. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a first plurality of storage devices each connected to receive communication request signals from a different one of said subsystems and each responsive to the receipt of a communication request signal for assuming a given stable state; a status signal generating means responsive to the status of said memory controller for generating a not busy signal; a second plurality of storage devices each connected to a different one of said first storage devices and each responsive to the simultaneous occurrence of said not busy signal and the given stable state of a connected one of said first plurality of storage devices for assuming a given stable state; priority means connected to said second plurality of storage devices responsive to a given stable state of more than one of said second plurality of storage devices for awarding priority of communication to a subsystem in accordance with a predetermined priority; said priority means including a plurality of presettable priority sharing devices each corresponding to a different one of said second plurality of storage and to a different one of said subsystems; each presettable priority sharing device inhibiting, for a predetermined time when preset, the awarding of priority to its particular corresponding subsystem when said subsystem requests communication, and any other subsystem requesting communication having a priority higher than said particular subsystem.

15. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a first plurality of storage devices each connected to receive communication request signals from a different one of said subsystems and each responsive to the receipt of a communication request signal for assuming a given stable state; a status signal generating means responsive to the status of said memory controller for generating a not busy signal; a second plurality of storage devices and each responsive to the simultaneous occurrence of said not busy signal and the given stable state of a connected one of said first plurality of storage devices for assuming a given stable state; priority means connected to said second plurality of storage devices responsive to a given stable state of more than one of said second plurality of storage devices for awarding priority of communication to a subsystem in accordance with a predetermined priority; said priority means including a plurality of presettable programmable bistable devices each corresponding to a different one of said second plurality of storage devices and to a different one of said subsystems; each presettable programmable bistable device inhibiting, for a predetermined time when preset, the awarding of priority to its particular corresponding subsystem when said subsystem requests communication.

16. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a first plurality of storage devices each connected to receive communication request signals from a different one of said subsystems and each responsive to the receipt of a communication request signal for assuming a given stable state; a status signal generating means responsive to the status of said memory controller for generating a not busy signal; a second plurality of storage devices each connected to a different one of said first storage devices and each responsive to the simultaneous occurrence of said not busy signal and the given stable state of a connected one of said first plurality of storage devices for assuming a given stable state; priority means connected to said second plurality of storage devices responsive to a given stable state of more than one of said second plurality of storage devices for awarding priority of communication to a subsystem in accordance with a predetermined priority; said priority means including a plurality of presettable programmable bistable devices each corresponding to a different one of said second plurality of storage devices and to a different one of said subsystems; each presettable programmable bistable device inhibiting, for a predetermined time when preset, the awarding of priority to its particular corresponding subsystem when said subsystem requests communication, and any other subsystem requesting communication having a priority higher than said particular subsystem.

17. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a first plurality of storage devices each connected to receive communication request signals from a different one of said subsystems and each responsive to the receipt of a communication request signal for assumming a given stable state; a status signal generating means responsive to the status of said memory controller for generating a not busy signal; a second plurality of storage devices each connected to a different one of said first storage devices and each responsive to the simultaneous occurrence of said not busy signal and the given stable state of a connected one of said first plurality of storage devices for assuming a given stable state; priority means connected to said second plurality of storage devices responsive to a given stable state of more than one of said second plurality of storage devices for awarding priority of communication to a subsystem in accordance with a predetermined priority; said priority means including a plurality of presettable switches each corresponding to a different one of said second plurality of storage devices and to a different one of said subsystems; each presettable switch inhibiting, for a predetermined time when preset, the awarding of priority to its particular corresponding subsystem when said subsystem requests communication.

18. In a data processing system the improvement comprising: a plurality of subsystems each requiring communication with other subsystems and each including means for generating communication request signals; a memory controller connected to said subsystems responsive to said communication request signals for awarding priority of communication among said subsystems, said memory controller including: a first plurality of storage devices each connected to receive communication request signals from a different one of said subsystems and each responsive to the receipt of a communication request signal for assuming a given stable state; a status signal generating means responsive to the status of said memory controller for generating a not busy signal; a second plurality of storage devices each connected to a different one of said first storage devices and each responsive to the simultaneous occurrence of said not busy signal and the given stable state of a connected one of said first plurality of storage devices for assuming a given stable state; priority means connected to said second plurality of storage devices responsive to a given stable state of more than one of said second plurality of storage devices for awarding priority of communication to a subsystem in accordance with a predetermined priority; said priority means including a plurality of presettable switches each corresponding to a different one of said second plurality of storage devices and to a different one of said subsystems; each presettable switch inhibiting, for a predetermined time when preset, the awarding of priority to its particular corresponding subsystem when said subsystem requests communication, and any other subsystem requesting communication having a priority higher than said particular subsystem.

19. The improvement defined in claim 13 wherein said predetermined priority is a fixed wired priority.

References Cited

UNITED STATES PATENTS

| | | | |
|---|---|---|---|
| 3,029,414 | 4/1962 | Schrimpf | 340—172.5 |
| 3,063,036 | 11/1962 | Reach | 340—172.5 |
| 3,222,647 | 12/1965 | Strachey | 340—172.5 |
| 3,312,951 | 4/1967 | Hertz | 340—172.5 |
| 3,323,109 | 5/1967 | Hecht | 340—172.5 |
| 3,331,055 | 7/1967 | Betz | 340—172.5 |
| 3,333,252 | 7/1967 | Shimabukyro | 340—172.5 |
| 3,099,818 | 7/1963 | Murray | 340—172.5 |

PAUL J. HENON, Primary Examiner

J. P. VANDENBURG, Assistant Examiner